(12) United States Patent
Long et al.

(10) Patent No.: US 11,309,796 B2
(45) Date of Patent: Apr. 19, 2022

(54) CONTROL METHOD OF SINGLE LIVE LINE CHARGING CIRCUIT, CONTROL CIRCUIT OF SINGLE LIVE LINE CHARGING CIRCUIT AND SINGLE LIVE LINE CHARGING CIRCUIT

(71) Applicant: Joulwatt Technology (Hangzhou) Co.,LTD., Hangzhou (CN)

(72) Inventors: Hao Long, Hangzhou (CN); Xunwei Zhou, Hangzhou (CN)

(73) Assignee: Joulwatt Technology (Hangzhou) Co., LTD., Hangzhou (CN)

( * ) Notice: Subject to any disclaimer, the term of this patent is extended or adjusted under 35 U.S.C. 154(b) by 154 days.

(21) Appl. No.: 16/847,692

(22) Filed: Apr. 14, 2020

(65) Prior Publication Data

US 2020/0335983 A1 Oct. 22, 2020

(30) Foreign Application Priority Data

Apr. 16, 2019 (CN) .......................... 201910306332.5

(51) Int. Cl.
*H02M 3/158* (2006.01)
*H05B 45/375* (2020.01)
*H02J 7/00* (2006.01)

(52) U.S. Cl.
CPC .......... *H02M 3/158* (2013.01); *H05B 45/375* (2020.01); *H02J 7/007* (2013.01); *H02M 3/1582* (2013.01)

(58) Field of Classification Search
CPC .. H02M 3/158; H02M 3/1582; H05B 45/375; H02J 7/007
See application file for complete search history.

(56) References Cited

U.S. PATENT DOCUMENTS

| 10,004,269 | B2* | 6/2018 | Xiang | .................... H05B 45/20 |
| 2015/0115710 | A1* | 4/2015 | Tuerk | ................... G01R 31/088 307/23 |
| 2016/0327226 | A1* | 11/2016 | Kaag | .................. H01M 10/615 |

* cited by examiner

*Primary Examiner* — Jue Zhang
(74) *Attorney, Agent, or Firm* — Bayramoglu Law Offices LLC

(57) ABSTRACT

A control method of a single live line charging circuit, a control circuit of a single live line charging circuit, and a single live line charging circuit are provided. The single live line charging circuit includes a first switch, a first conduction element, a first inductor, a second switch, a second conduction element, a third switch, a first input end and a second input end; the first input end is connected to a first end of the first switch through the second conduction element; the first switch, the first conduction element and the first inductor constitute a buck circuit; the first input end is connected to a reference ground through the second switch, the second input end is connected to the reference ground through the third switch, and an alternating current input is connected to the first input end through a load circuit.

19 Claims, 13 Drawing Sheets

CONTROL METHOD OF SINGLE LIVE LINE CHARGING CIRCUIT, CONTROL CIRCUIT OF SINGLE LIVE LINE CHARGING CIRCUIT AND SINGLE LIVE LINE CHARGING CIRCUIT

CROSS REFERENCE TO THE RELATED APPLICATIONS

This application is based upon and claims priority to Chinese Patent Application No. 201910306332.5, filed on Apr. 16, 2019, the entire contents of which are incorporated herein by reference.

TECHNICAL FIELD

The present invention relates to the technical field of power electronics, and more particularly to a control method of a single live line charging circuit, a control circuit of a single live line charging circuit, and a single live line charging circuit.

BACKGROUND

The home appliance control switch panel generally integrates a variety of sensor units and provides input interface for detection and control of various devices or lighting fixtures. These sensor units need to be supplied with power. However, the traditional wall mechanical switch pattress has only one live line, thus supplying power for the wall switch with a neutral line loop, and has become a bottleneck restricting the intelligent upgrade of traditional equipment. As a result, it is of great importance to provide a stable and safe single live line power supply.

FIG. 1 shows a solution of a single live line power supply. The switch K01 is the switch on the switch panel, and the switch panel controls the on-off of the load circuit 100. The load module 100 is usually a lighting load, including incandescent lamp, energy-saving fluorescent lamp, light-emitting diode (LED) lighting and the like. The load power ranges from 3 W to 1 kW.

In the solution of single live line power supply, the energy storage capacitor CS is charged by controlling the switch K01 connected in series on the live line. The switch K01 can be a relay. In order to reduce the drive loss of ordinary relay and improve the load capacity of the single live line application, the magnetic latching relay is used in many cases. However, the magnetic latching relay complicates the whole power supply system, and requires more components on the periphery of the application system, resulting in an increased cost.

SUMMARY

In view of the problems in the prior art, objectives of the present invention are to provide a control method of a single live line charging circuit, a control circuit of the single live line charging circuit, and the single live line charging circuit, so as to solve the problems in the prior art, namely that inevitable use of relay complicates the whole power supply system, requires more components on the periphery of the application system, and results in an increased cost.

The technical solution of the present invention is to provide a control method of a single live line charging circuit. The charging circuit includes a first switch, a first conduction element, a first inductor, a second switch, a second conduction element, a third switch, a first input end and a second input end. The first input end is connected to a first end of the first switch through the second conduction element. The first switch, the first conduction element and the first inductor constitute a buck circuit. The first input end is connected to a reference ground through the second switch, the second input end is connected to the reference ground through the third switch, and an alternating current input is connected to the first input end through a load circuit.

When the load circuit is turned off, the first switch, the first conduction element and the first inductor work in a buck mode, and both the second switch and the third switch are turned off.

When the load circuit is turned on, the output end of the charging circuit is in a charging state when the voltage of the output end of the charging circuit relative to the reference ground is lower than a first voltage threshold, the output end of the charging circuit is in a non-charging state when the voltage of the output end of the charging circuit rises to a second voltage threshold, and the output end of the charging circuit returns to the charging state when the voltage of the output end of the charging circuit decreases to the first voltage threshold.

The second voltage threshold is greater than the first voltage threshold.

The first conduction element and the second conduction element are diodes or switches.

Optionally, in the charging state, when the voltage of the first input end is greater than the voltage of the second input end, the second switch is turned off, the third switch is turned off or completely turned on, or a drain voltage of the third switch is made to approach a third voltage by controlling a control electrode voltage of the third switch; when the voltage of the first input end is less than the voltage of the second input end, the third switch is completely turned on, the second switch is turned off or completely turned on, or a drain voltage of the second switch is made to approach a second voltage by controlling a control electrode voltage of the second switch. In the non-charging state, both the second switch and the third switch are turned on.

Optionally, the charging circuit further includes a third conduction element, and the second input end is connected to the first end of the first switch through the third conduction element.

Optionally, in the charging state, when the voltage of the first input end is greater than the voltage of the second input end, the second switch is turned off, the third switch is turned off or completely turned on, or the drain voltage of the third switch is made to approach the third voltage by controlling the control electrode voltage of the third switch; when the voltage of the first input end is less than the voltage of the second input end, the third switch is turned off, the second switch is turned off or completely turned on, or the drain voltage of the second switch is made to approach the second voltage by controlling the control electrode voltage of the second switch; in the non-charging state, both the second switch and the third switch are turned on.

Optionally, in the charging state, when the input current is less than a first current threshold, the input current charges the output end of the charging circuit.

Optionally, in the charging state, when the current of the first switch is greater than the first current threshold, the first switch is turned off, the second switch and the third switch are turned on.

The present invention further provides a control circuit of a single live line charging circuit. The charging circuit includes a first switch, a first conduction element, a first inductor, a second switch, a second conduction element, a third switch, a first input end and a second input end. The first input end is connected to a first end of the first switch through the second conduction element. The first switch, the first conduction element and the first inductor constitute a buck circuit. The first input end is connected to a reference ground through the second switch, the second input end is connected to the reference ground through the third switch, and an alternating current input is connected to the first input end through a load circuit.

When the control circuit receives a signal indicating a turn-off of the load circuit, the control circuit controls the first switch, the first conduction element and the first inductor to work in a buck mode, and controls both the second switch and the third switch to be turned off.

When the control circuit receives a signal indicating a turn-on of the load circuit, the control circuit controls the output end of the charging circuit to be in a charging state when the voltage of the output end of the charging circuit relative to the reference ground is lower than a first voltage threshold, the control circuit controls the output end of the charging circuit to be in a non-charging state when the voltage of the output end of the charging circuit rises to a second voltage threshold, and the output end of the charging circuit returns to the charging state when the voltage of the output end of the charging circuit decreases to the first voltage threshold.

The second voltage threshold is greater than the first voltage threshold. The first conduction element and the second conduction element are diodes or switches.

Optionally, the control circuit detects the voltages of the first input end and the second input end. In the charging state, when the voltage of the first input end is greater than the voltage of the second input end, the control circuit controls the second switch to be turned off, controls the third switch to be turned off or completely turned on, or controls a control electrode voltage of the third switch to make a drain voltage of the third switch close to a third voltage; when the voltage of the first input end is less than the voltage of the second input end, the control circuit controls the third switch to be completely turned on, controls the second switch to be turned off or completely turned on, or controls a control electrode voltage of the second switch to make a drain voltage of the second switch close to a second voltage. In the non-charging state, the control circuit controls both the second switch and the third switch to be turned on.

Optionally, the charging circuit further includes a third conduction element, and the second input end is connected to the first end of the first switch through the third conduction element.

Optionally, the charging circuit further includes a microprocessor. The microprocessor receives a signal that the load circuit is turned on or off, converts the signal into a signal indicating a turn-on or a turn-off of the load circuit, and sends the signal indicating the turn-on or the turn-off of the load circuit to the control circuit.

Another technical solution of the present invention is to provide a single live line charging circuit.

Compared with the prior art, the circuit structure and method of the present invention have the following advantages. The application of the single live line is much more simplified, and relay elements are removed, so that the single live line has been more widely used in devices with load power. Moreover, the single live line charging circuit has the on-state and off-state charging functions, and there is no need to additionally integrate an off-state charging circuit, which results in an integrated system, reduces application volume, diminishes cost, and realizes the upgrade of conventional equipment from contact control to intelligent control.

BRIEF DESCRIPTION OF THE DRAWINGS

FIG. 4 (b) is a schematic diagram showing waveforms of the input voltage, the input current, the output voltage, the control electrode voltage of the second switch, and the control electrode voltage of the third switch in half-wave power supply mode according to another embodiment of the present invention;

FIG. 8 (b) is a schematic diagram showing waveforms of the input voltage, the input current, the output voltage, the control electrode voltage of the second switch, and the control electrode voltage of the third switch in full-wave power supply mode according to another embodiment of the present invention;

DETAILED DESCRIPTION OF THE EMBODIMENTS

Hereinafter, preferred embodiments of the present invention are described in detail with reference to the drawings, but the present invention is not merely limited to these embodiments. The present invention covers any substitutions, modifications, equivalent methods and solutions made within the spirit and scope of the present invention.

In order to make the public have a thorough understanding of the present invention, specific details are described in the following preferred embodiments of the present invention, and those skilled in the art can fully understand the present invention without the description of these details.

The present invention is described in more detail by means of listing examples in the following paragraphs with reference to the drawings. It should be noted that the drawings each are in a simplified form and may use inaccurate proportions, and are only used to facilitate and clearly assist the description of the embodiments of the present invention.

Figure 1:
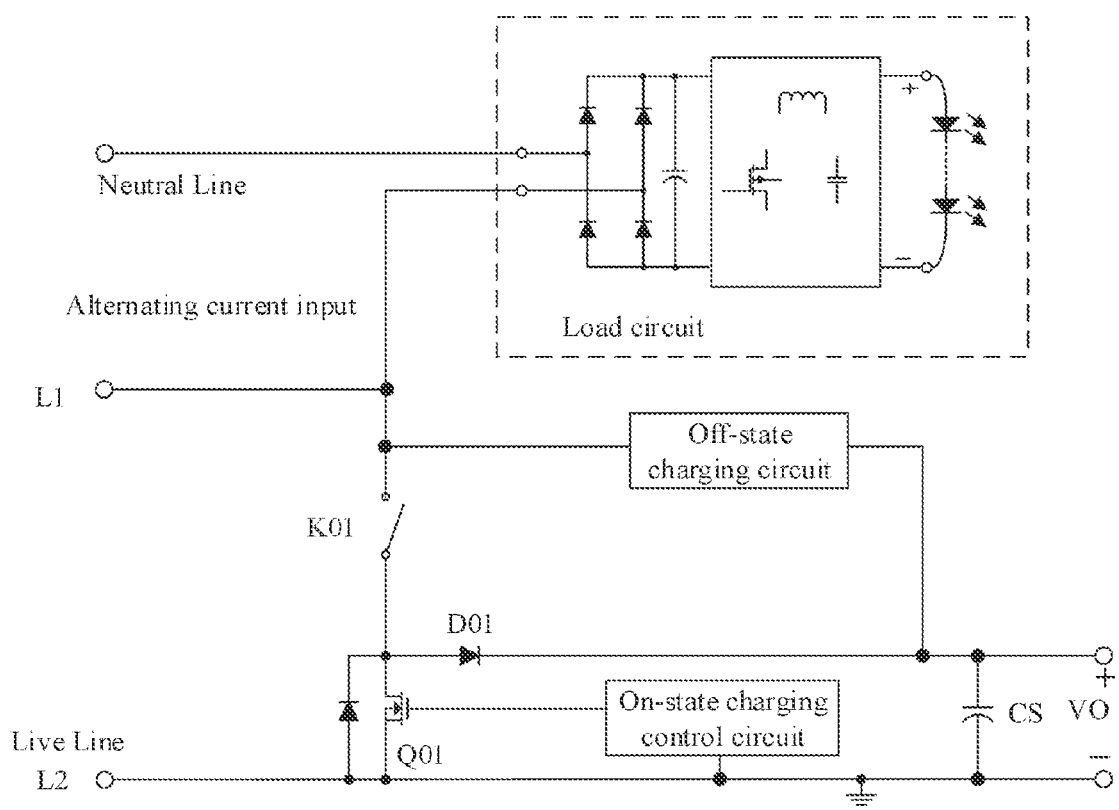
FIG. 1 is a schematic diagram of a half-wave power supply of a single live line in the prior art.
Figure 2:
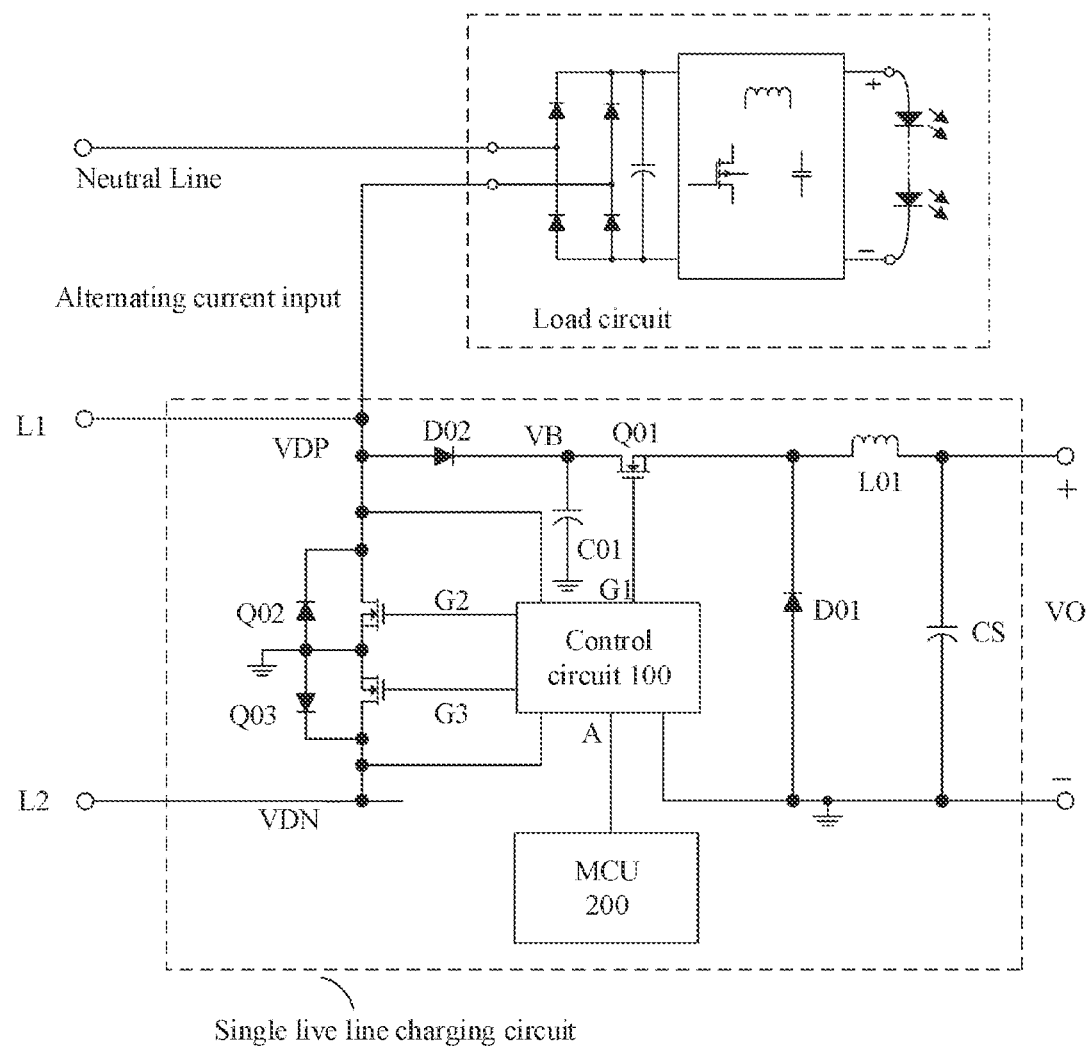
FIG. 2 is a schematic diagram of a single live line half-wave power supply circuit of the present invention.

As is shown in FIG. 2, the present invention provides a control method of a single live line charging circuit. The charging circuit includes the first switch Q01, the first conduction element D01, the first inductor L01, the second switch Q02, the second conduction element D02, the third switch Q03, the first input end L1 and the second input end L2. The first input end L1 is connected to the first end of the first switch Q01 through the second conduction element D02. The first switch Q01, the first conduction element D01 and the first inductor L01 constitute a buck circuit. The first input end L1 is connected to the reference ground through the second switch Q02, the second input end L2 is connected to the reference ground through the third switch Q03, and the alternating current input is connected to the first input end L1 through a load circuit.

When the load circuit is turned off, the first switch Q01, the first conduction element D01 and the first inductor L01 work in the buck mode, and both the second switch Q02 and the third switch Q03 are turned off.

When the load circuit is turned on, the output end of the charging circuit is in a charging state when the voltage of the output end of the charging circuit relative to the reference ground is lower than a first voltage threshold, the output end of the charging circuit is in a non-charging state when the voltage of the output end of the charging circuit rises to a second voltage threshold, and the output end of the charging circuit returns to the charging state when the voltage of the output end of the charging circuit decreases to the first voltage threshold.

The second voltage threshold is greater than the first voltage threshold. The first conduction element and the second conduction element are diodes or switches.

The solution of the present invention simplifies the application of the single live line, removes the relay element, and has been more widely used in devices with load power. Moreover, the single live line charging circuit has the on-state and off-state charging functions, and there is no need to additionally integrate off-state charging circuit, which results in an integrated system, reduces application volume, diminishes cost, and realize the upgrade of traditional equipment from contact control to intelligent control.

The first switch, the second switch and the third switch in the present embodiment are preferably metal oxide semiconductor (MOS) transistors, more specifically N-channel metal oxide semiconductor (NMOS) transistors, but may also be other types of switches, such as triodes, thyristors, switches formed by connecting a plurality of the aforementioned transistors and so on.

Figure 3:
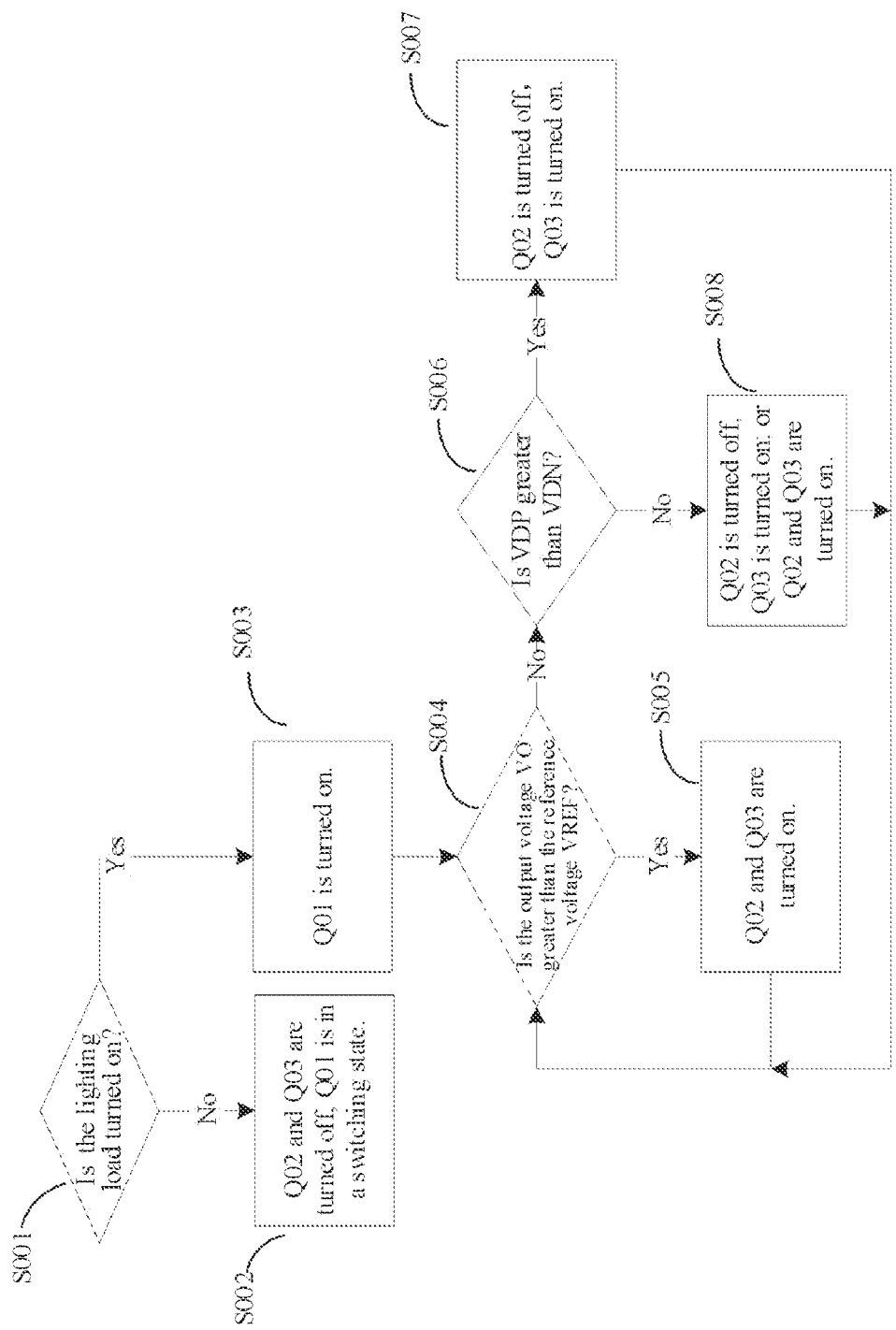
FIG. 3 is a flow chart of a control method of a single live line charging circuit in half-wave power supply mode according to one embodiment of the present invention.

FIG. 3 shows an embodiment of the control method of the single live line charging circuit.

Step S001: the lighting load is determined whether to be turned on or not; if not, proceed to step S002; if yes, proceed to step S003.

Step S002: the second switch Q02 and the third switch Q03 are turned off, and the first switch Q01, the first conduction element D01 and the first inductor L01 work in the buck mode.

Step S003: the first switch Q01 is turned on, and proceed to step S004.

Step S004: the output voltage VO is determined whether to be greater than the reference voltage VREF or not, if yes, proceed to step S005, if not, proceed to step S006.

Step S005: in the non-charging state, both the second switch Q02 and the third switch Q03 are turned on, and return to step S004.

Step S006: in the charging state, the voltage VDP of the first input end is determined to be greater than the voltage VDN of the second input end or not, if yes, proceed to step S007, if not, proceed to step S008.

Figure 4:
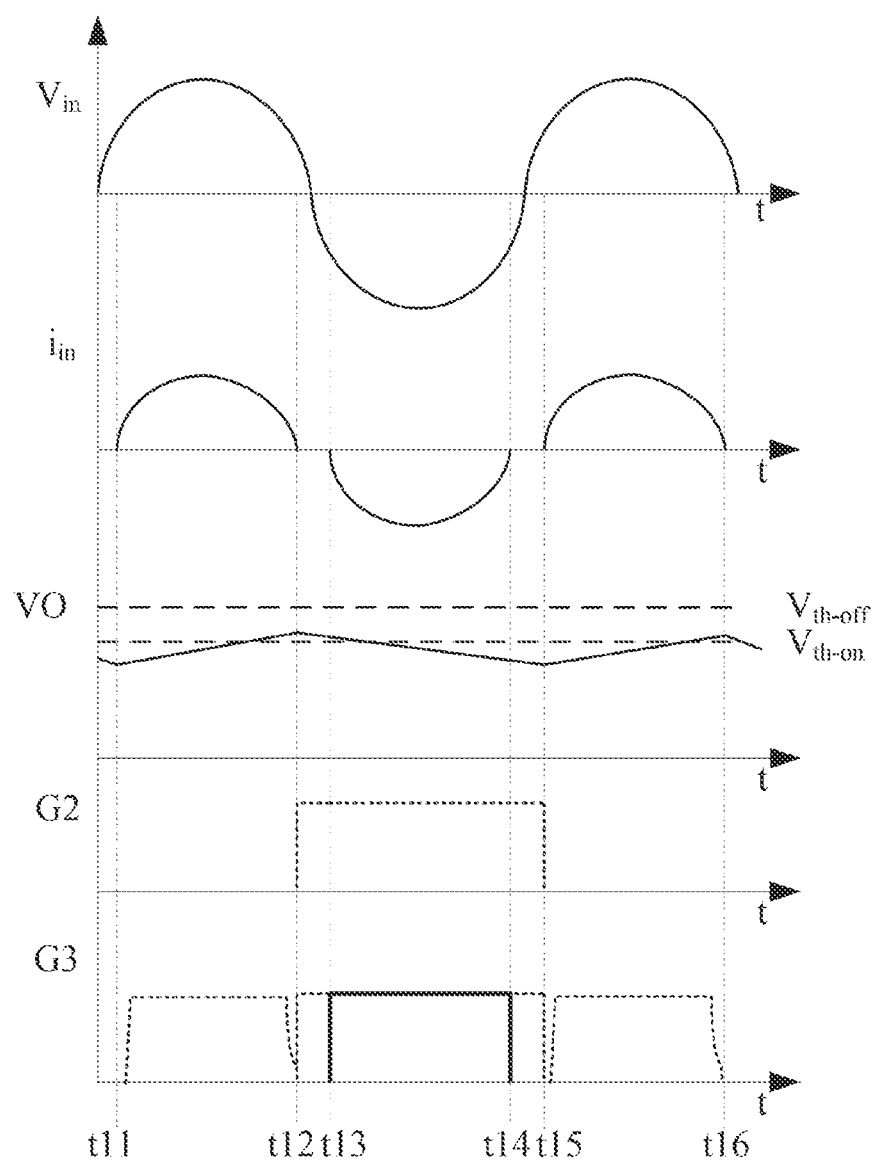
FIG. 4 (a) is a schematic diagram showing waveforms of the input voltage, the input current, the output voltage, the control electrode voltage of the second switch, and the control electrode voltage of the third switch in half-wave power supply mode according to one embodiment of the present invention.
Figure 4:
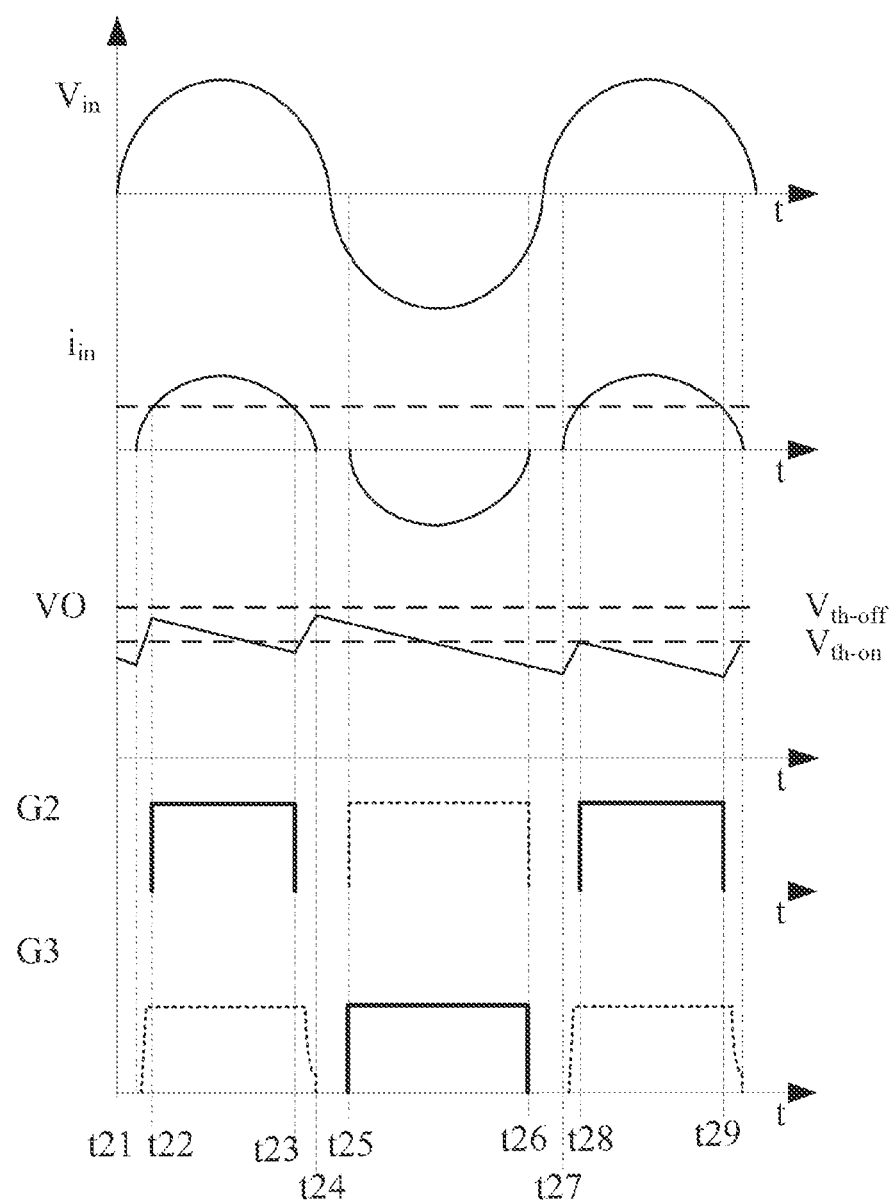

Step S007: when the voltage VDP of the first input end is greater than the voltage VDN of the second input end, the second switch Q02 is turned off, and the third switch Q03 is turned off or completely turned on, or the drain voltage of the third switch is made to approach the third voltage by controlling the control electrode voltage of the third switch. Return to step S004. Referring to FIG. 4 (a), the second switch Q02 and the third switch Q03 are NMOS, and G2 and G3 are the gates of the second switch Q02 and the third switch Q03, respectively. During the t11-t12, the VDP is greater than the VDN, G2 is in a low potential, the second switch Q02 is turned off, and the current flows from the first input end L1 through the second conduction element D02, the first switch Q01 and the first inductor L01 to charge the output end of the charging circuit. When the third switch is turned off, the current flows from the reference ground through the body diode of the third switch to the second input end L2. In order to further reduce the loss, the third switch Q03 can be controlled to be completely turned on, or the drain voltage of the third switch is made to approach the third voltage by controlling the control electrode voltage of the third switch, so as to reduce the conduction voltage drop and improve the system efficiency. Therefore, in FIG. 4 (a), in the t11-t12, the waveform of G3 is represented by a broken line, which can be in the form of a broken line or a low potential.

Step S008: when the voltage VDP of the first input end is less than the voltage VDN of the second input end, the third switch Q03 is completely turned on, as in FIG. 4 (a), the third switch is NMOS, and the gate voltage G3 of the third switch is high. The second switch Q02 is turned off or completely turned on, or the drain voltage of the second switch is made to approach the second voltage by controlling the control electrode voltage of the second switch. Return to step S004. At this time, the output end of the charging circuit is not charged, and when the second switch is turned off, the current flows from the second input end L2 through the third switch Q03, and then through the body diode of the second switch to the first input end L1. In order to further reduce the loss, the second switch Q02 can be controlled to be completely turned on, or the drain voltage of the second switch is made to approach the second voltage by controlling the control electrode voltage of the second switch, so as to reduce the conduction voltage drop and improve the system efficiency. Therefore, in FIG. 4 (a), in the t13-t14, the waveform of G2 is represented by a broken line, which can be in the form of a broken line or a low potential.

In the charging state, the current passing through the second conduction element D02 is determined by the input current. When the input current is relatively large, the current passing through the second conduction element D02 will also be relatively large, and the second conduction element D02 has great loss and produces plenty of heat. In order to reduce the loss of the second conduction element, the output end of the charging circuit is charged only when the input current is small. Referring to FIG. 4 (b), between t21 and t22, the input current is less than a first current threshold, G2 is in a low potential, and the second switch is turned off, so as to charge the output end of the charging circuit. Between t22 and t23, the input current is greater than the first current threshold, G2 is in a high potential, the second switch is turned on, and the current flows from the first input end L1 through the second switch to the third switch and then to the second input end L2, thus not charging the output end of the charging circuit. The gate voltage G3 of the third switch can be high or low. When the gate voltage G3 of the third switch is low, the current passes through the body diode of the third switch. In order to further reduce the loss, the gate voltage of the third switch is controlled to be high, the third switch is turned on, and the voltage drop of the current on the third switch is further reduced.

Figure 5:
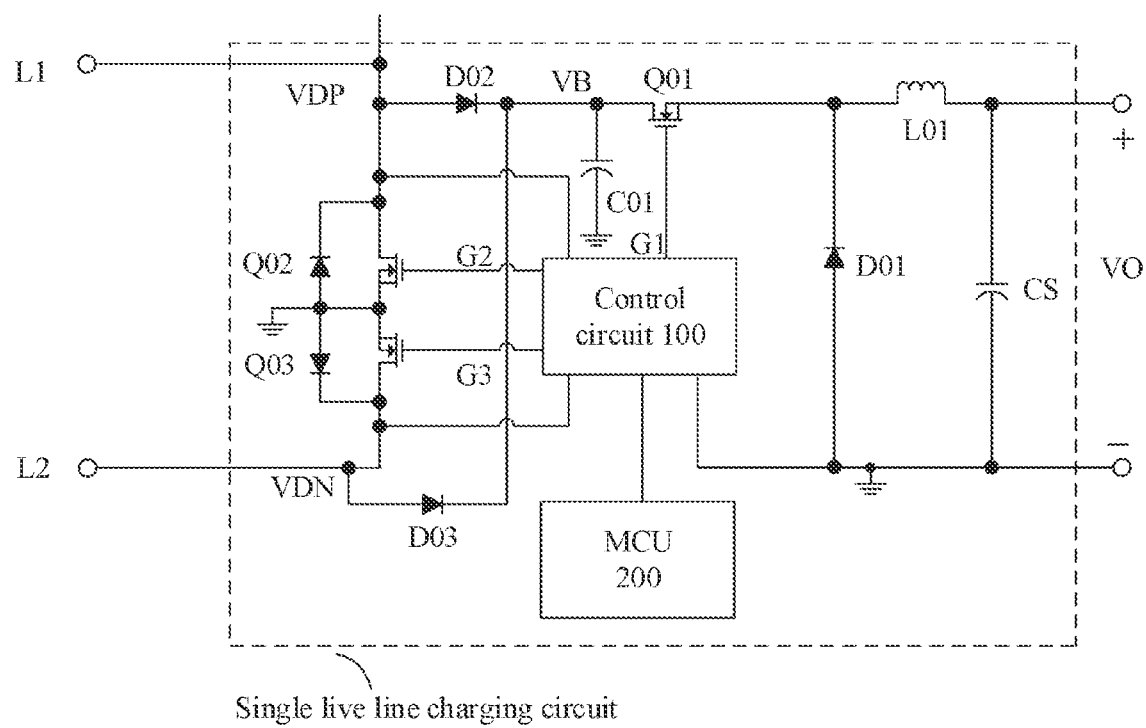
FIG. 5 is a schematic diagram of a single live line full-wave power supply circuit of the present invention.

In the half-wave power supply mode, the capacitor CS can be charged for only half of the power frequency cycle. In order to widen the output power range, the charging circuit can adopt the full-wave power supply mode. Referring to FIG. 5, the charging circuit further includes the third conduction element D03, and the second input end L2 is connected to the first end of the first switch Q01 through the third conduction element D03.

Figure 6:
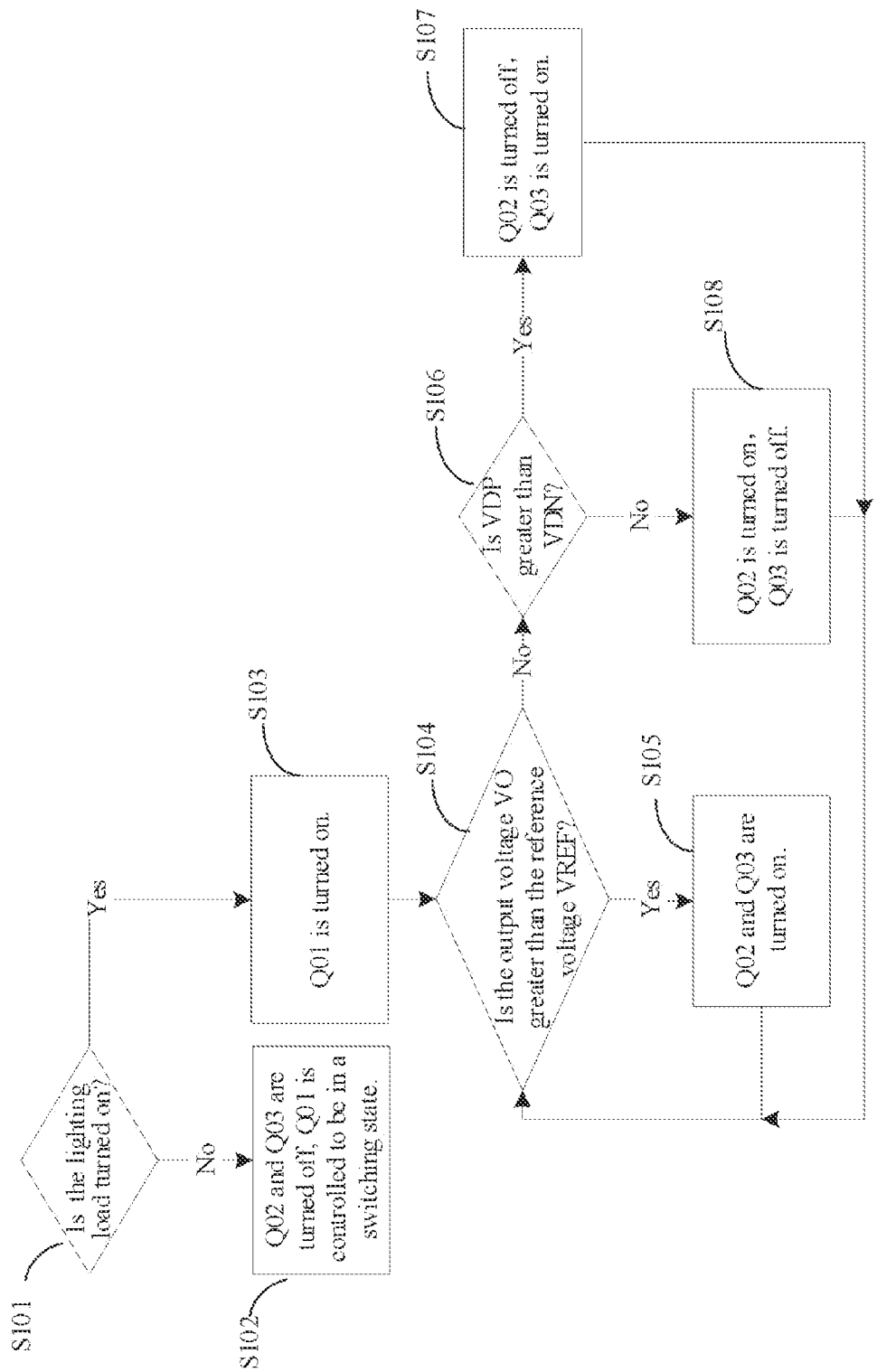
FIG. 6 is a flow chart of a control method of a single live line charging circuit in full-wave power supply mode according to one embodiment of the present invention.

The flow chart of the control method of the single live line charging circuit when in full-wave power supply mode is shown in FIG. 6, which includes the following steps.

Step S101: the lighting load is determined whether to be turned on or not; if not, proceed to step S102; if yes, proceed to step S103.

Step S102: the second switch Q02 and the third switch Q03 are turned off, and the first switch Q01, the first conduction element D01 and the first inductor L01 work in the buck mode.

Step S103: the first switch Q01 is turned on, and proceed to step S104.

Step S104: the output voltage VO is determined whether to be greater than the reference voltage VREF or not, if yes, proceed to step S105, if not, proceed to step S106.

Step S105: in the non-charging state, both the second switch Q02 and the third switch Q03 are turned on. Return to step S104.

Step S106: in the charging state, the voltage VDP of the first input end is determined to be greater than the voltage VDN of the second input end or not, if yes, proceed to step S107, if not, proceed to step S108.

Step S107: when the voltage VDP of the first input end is greater than the voltage VDN of the second input end, the second switch Q02 is turned off, and the third switch Q03 is completely turned on, or the drain voltage of the third switch is made to approach the third voltage by controlling the control electrode voltage of the third switch. Return to step S104.

Step S108: when the voltage VDP of the first input end is less than the voltage VDN of the second input end, the third switch Q03 is turned off, and the second switch Q02 is completely turned on, or the drain voltage of the second switch is made to approach the second voltage by controlling the control electrode voltage of the second switch. Return to step S104.

Figure 7:
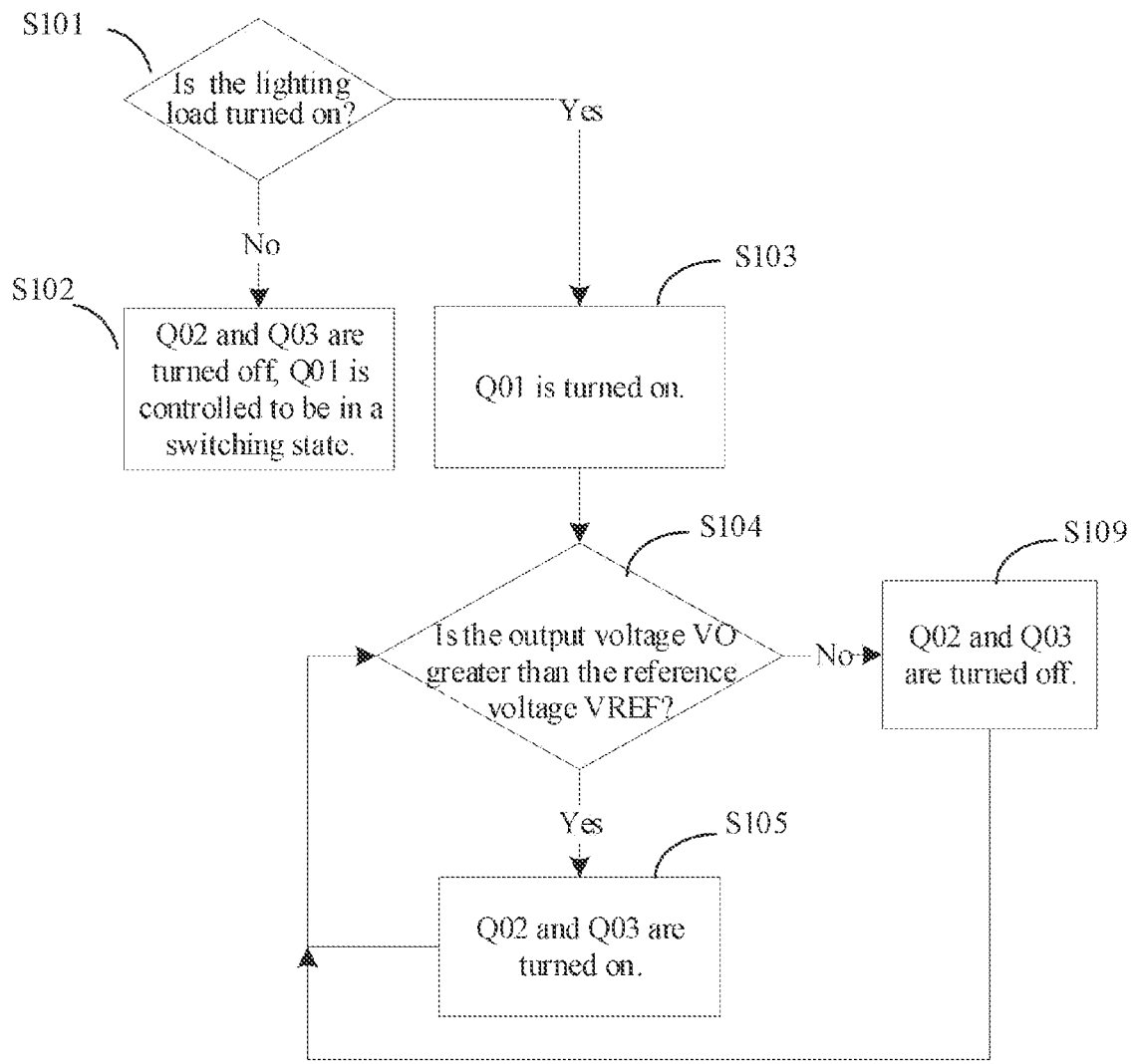
FIG. 7 is a flow chart of a control method of a single live line charging circuit in full-wave power supply mode according to another embodiment of the present invention.

In step S107 and step S108, Q02 and Q03 may be turned off. In this case, it is not necessary to determine the voltage VDP of the first input end and the voltage VDN of the second input end. Therefore, the flow chart is shown in FIG. 7 and includes the following steps.

Step S101: the lighting load is determined whether to be turned on or not; if not, proceed to step S102; if yes, proceed to step S103.

Step S102: the second switch Q02 and the third switch Q03 are turned off, and the first switch Q01, the first conduction element D01 and the first inductor L01 work in the buck mode.

Step S103: the first switch Q01 is turned on, and proceed to step S104.

Step S104: the output voltage VO is determined whether to be greater than the reference voltage VREF or not, if yes, proceed to step S105, if not, proceed to step S109.

Step S105: in the non-charging state, both the second switch Q02 and the third switch Q03 are turned on. Return to step S104.

Step S109: in the charging state, the second switch Q02 and the third switch Q03 are both turned off. Return to step S104.

Figure 8:
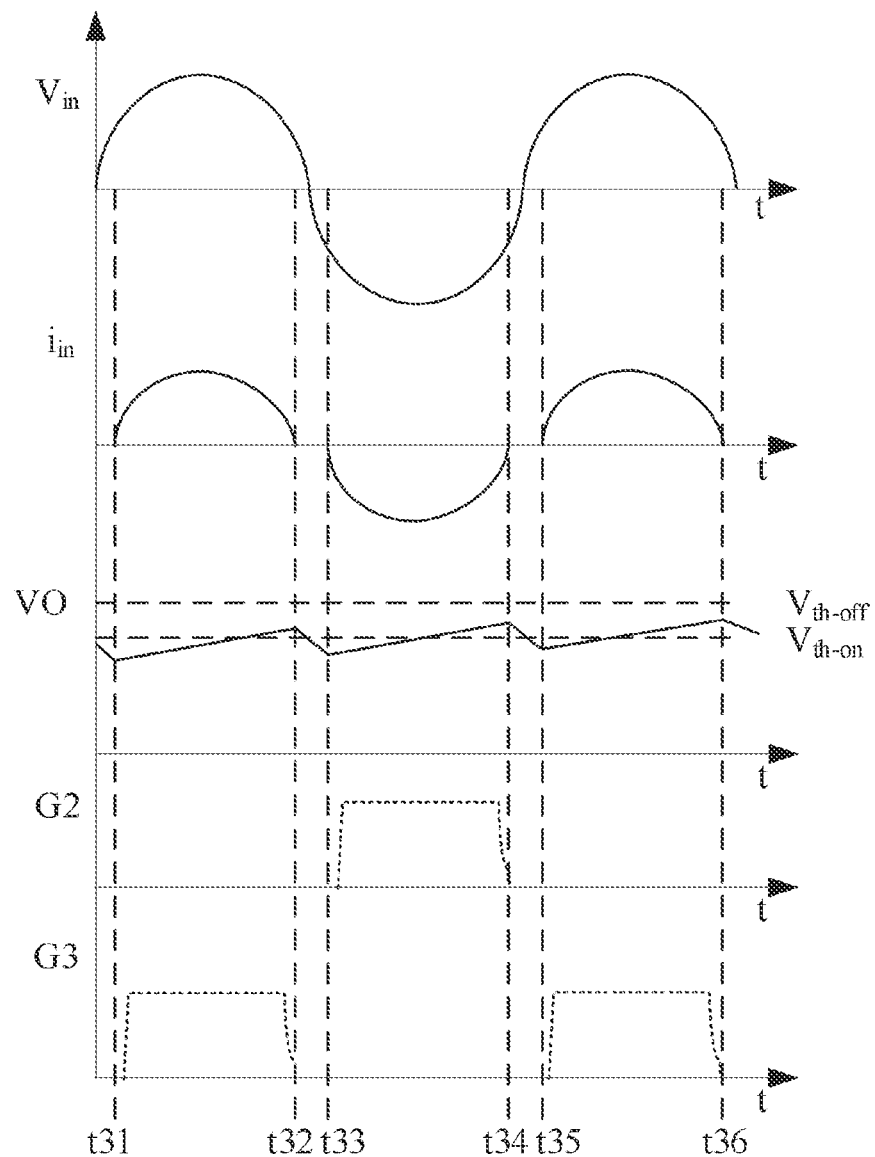
FIG. 8 (a) is a schematic diagram showing waveforms of the input voltage, the input current, the output voltage, the control electrode voltage of the second switch, and the control electrode voltage of the third switch in full-wave power supply mode according to one embodiment of the present invention.
Figure 8:
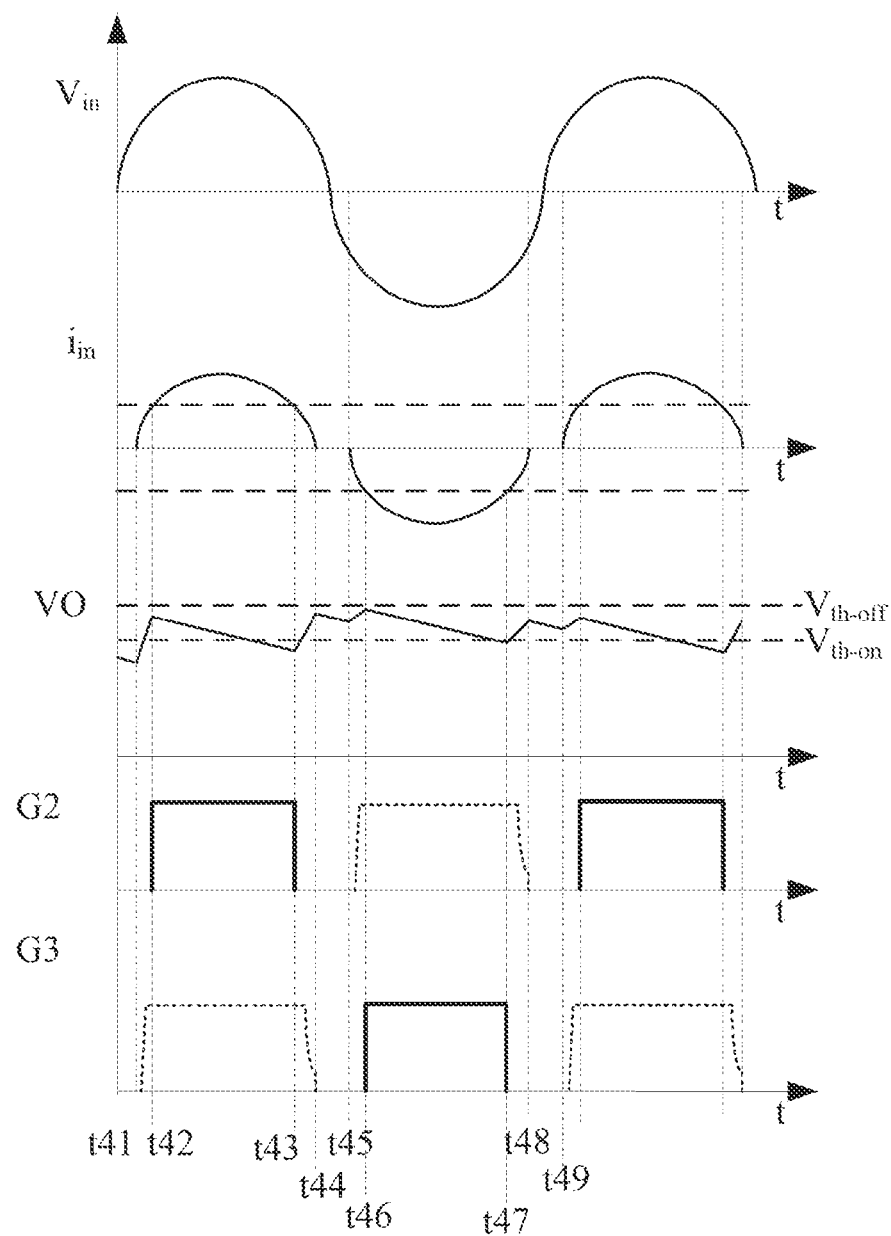

Referring to FIG. 8 (a), the second switch Q02 and the third switch Q03 are NMOS, and G2 and G3 are the gates of the second switch Q02 and the third switch Q03, respectively. During the t31-t32, the VDP is greater than the VDN, G2 is in a low potential, the second switch Q02 is turned off, and the current flows from the first input end L1 through the second conduction element D02, the first switch Q01 and the first inductor L01 to charge the output end of the charging circuit. When the third switch is turned off, the current flows from the reference ground through the body diode of the third switch to the second input end L2. In order to further reduce the loss, the third switch Q03 can be controlled to be completely turned on, or the drain voltage of the third switch is made to approach the third voltage by controlling the control electrode voltage of the third switch, so as to reduce the conduction voltage drop and improve the system efficiency. Therefore, in FIG. 8 (a), in the t31-t32, the waveform of G3 is represented by a broken line, which can be in the form of a broken line or a low potential.

In the charging state, the current passing through the second conduction element D02 and the third conduction element D03 is determined by the input current. When the input current is relatively large, the current passing through the second conduction element D02 and the third conduction element D03 will also be large, and the second conduction element D02 and the third conduction element D03 have great loss and produce plenty of heat. In order to reduce the loss of the second conduction element and the third conduction element, the output end of the charging circuit is charged only when the input current is small. Referring to FIG. 8 (b), between t41 and t42, the input current is less than the first current threshold, G2 is in a low potential, and the second switch is turned off, so as to charge the output end of the charging circuit. Between t42 and t43, the input current is greater than the first current threshold, G2 is in a high potential, the second switch is turned on, and the current flows from the first input end L1 through the second switch to the third switch and then to the second input end L2, thus not charging the output end of the charging circuit. The gate voltage G3 of the third switch can be high or low. When the gate voltage G3 of the third switch is low, the current passes through the body diode of the third switch. In order to further reduce the loss, the gate voltage of the third switch is controlled to be high, the third switch is turned on, and the voltage drop of the current on the third switch is further reduced.

As is shown in FIG. 2, the present invention further provides a control circuit of a single live line charging circuit. The charging circuit includes the first switch Q01, the first conduction element D01, the first inductor L01, the second switch Q02, the second conduction element D02, the third switch Q03, the first input end L1 and the second input end L2. The first input end L1 is connected to the first end of the first switch Q01 through the second conduction element D2. The first switch Q01, the first conduction element D01 and the first inductor L01 constitute a buck circuit. The first input end L1 is connected to the reference ground through the second switch Q02, the second input end L2 is connected to the reference ground through the third switch Q03, and the alternating current input is connected to the first input end L1 through a load circuit.

When the control circuit receives a signal indicating the turn-off of the load circuit, the control circuit controls the first switch, the first conduction element and the first inductor to work in the buck mode, and controls both the second switch and the third switch to be turned off.

When the control circuit receives a signal indicating the turn-on of the load circuit, the control circuit controls the output end of the charging circuit to be in a charging state when the voltage of the output end of the charging circuit relative to the reference ground is lower than a first voltage threshold, the control circuit controls the output end of the charging circuit to be in a non-charging state when the voltage of the output end of the charging circuit rises to a second voltage threshold, and the output end of the charging circuit returns to the charging state when the voltage of the output end of the charging circuit decreases to the first voltage threshold.

The second voltage threshold is greater than the first voltage threshold. The first conduction element and the second conduction element are diodes or switches.

In an embodiment, the control circuit 100 detects the voltages of the first input end L1 and the second input end L2. In the charging state, when the voltage VDP of the first input end is greater than the voltage VDN of the second input end, the control circuit controls the second switch Q02 to be turned off, controls the third switch Q03 to be turned off or completely turned on, or controls the control electrode voltage of the third switch to make the drain voltage of the third switch close to the third voltage; when the voltage VDP of the first input end is less than the voltage VDN of the second input end, the control circuit 100 controls the third switch Q03 to be completely turned on, controls the second switch Q02 to be turned off or completely turned on, or controls the control electrode voltage of the second switch to make the drain voltage of the second switch close to the second voltage. In the non-charging state, the control circuit 100 controls both the second switch Q02 and the third switch Q03 to be turned on.

Figure 9:
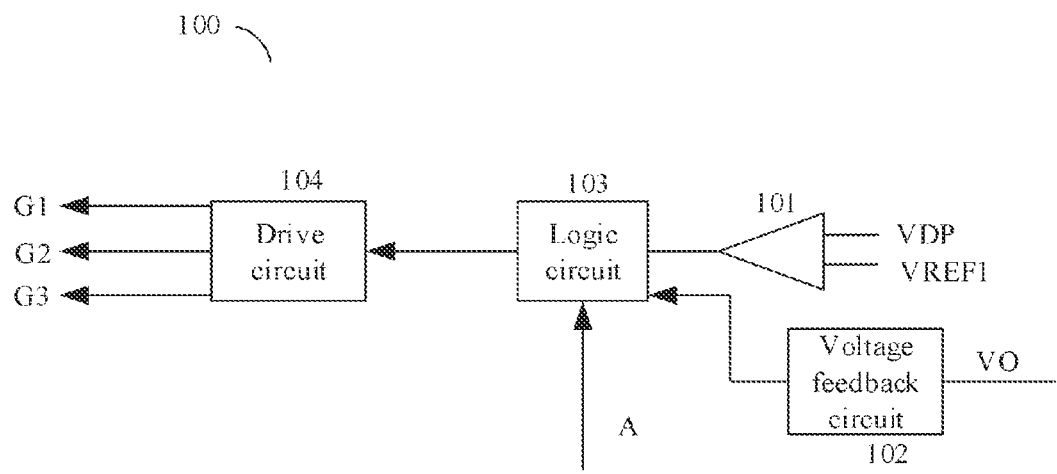
FIG. 9 is a schematic diagram of the control circuit 100 in an embodiment of the present invention.

In an embodiment, as shown in FIG. 9, the control circuit 100 includes the comparison circuit 101, the voltage feedback circuit 102, the logic circuit 103 and the drive circuit 104. The voltage feedback circuit 102 receives the output voltage of the charging circuit and compares the output voltage of the charging circuit with the first voltage threshold and the second voltage threshold. The output of the voltage feedback circuit indicates whether the output end of the charging circuit is in a charging state or not. The logic circuit 103 receives the output voltage of the voltage feedback circuit 102. The comparison circuit 101 compares the voltage VDP of the first input end with the VREF1, and the output of the comparison circuit 101 indicates the comparison result of the voltage of the first input end and the voltage of the second input end. The logic circuit 103 receives the output voltage of the comparison circuit 101. The logic circuit 103 further receives the signal A indicating that the load circuit is turned on or off. The drive circuit 104 receives the output voltage of the logic circuit 103 and drives the first switch, the second switch and the third switch. When the logic circuit 103 receives the signal indicating the turn-off of the load circuit, the logic circuit controls the drive circuit 104 to drive the first switch to operate in the buck mode and drive both the second switch and the third switch to be turned off. When the logic circuit 103 receives the signal indicating the turn-on of the load circuit, the logic circuit controls the drive circuit 104 to drive the first switch to be turned on, and the voltage feedback circuit 102 compares the voltage of the output end of the charging circuit with the first voltage threshold and the second voltage threshold. When the voltage of the output end of the charging circuit relative to the reference ground is lower than the first voltage threshold, the output of the voltage feedback circuit 102 indicates that the output end of the charging circuit is in the charging state. When the voltage of the output end of the charging circuit rises to the second voltage threshold, the output of the voltage feedback circuit 102 indicates that the output end of the charging circuit is in the non-charging state. When the voltage of the output end of the charging circuit decreases to the first voltage threshold, the output end of the charging circuit returns to the charging state. In the charging state, when the comparator 101 detects that the voltage VDP of the first input end is greater than the voltage VDN of the second input end, the logic circuit 103 controls the drive circuit 104 to drive the second switch Q02 to be turned off and drive the third switch Q03 to be turned off or completely turned on, or controls the control electrode voltage of the third switch to make the drain voltage of the third switch close to the third voltage. When the comparator 101 detects that the voltage VDP of the first input end is less than the voltage VDN of the second input end, the logic circuit 103 controls the drive circuit 104 to drive the third switch Q03 to be completely turned on and drive the second switch Q02 to be turned off or completely turned on, or controls the control electrode voltage of the second switch to make the drain voltage of the second switch close to the second voltage. In the non-charging state, the logic circuit 103 controls the drive circuit 104 to drive both the second switch Q02 and the third switch Q03 to be turned on.

Figure 10:
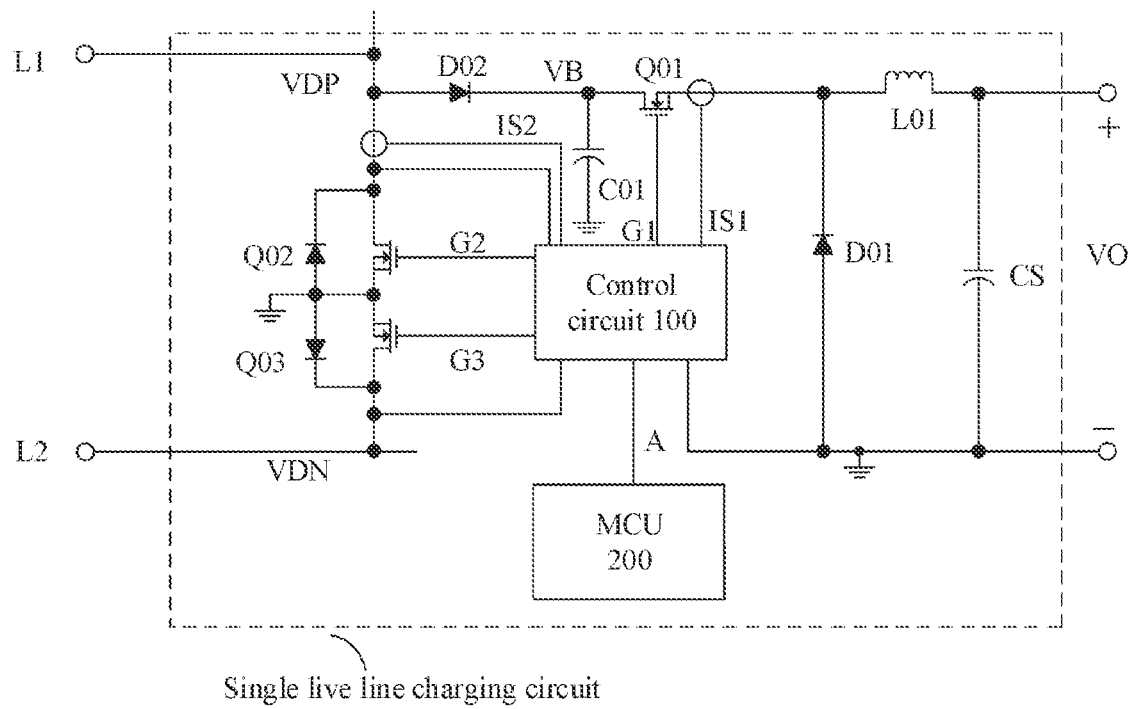
FIG. 10 is a schematic diagram of a single live line half-wave power supply circuit in another embodiment of the present invention.
Figure 11:
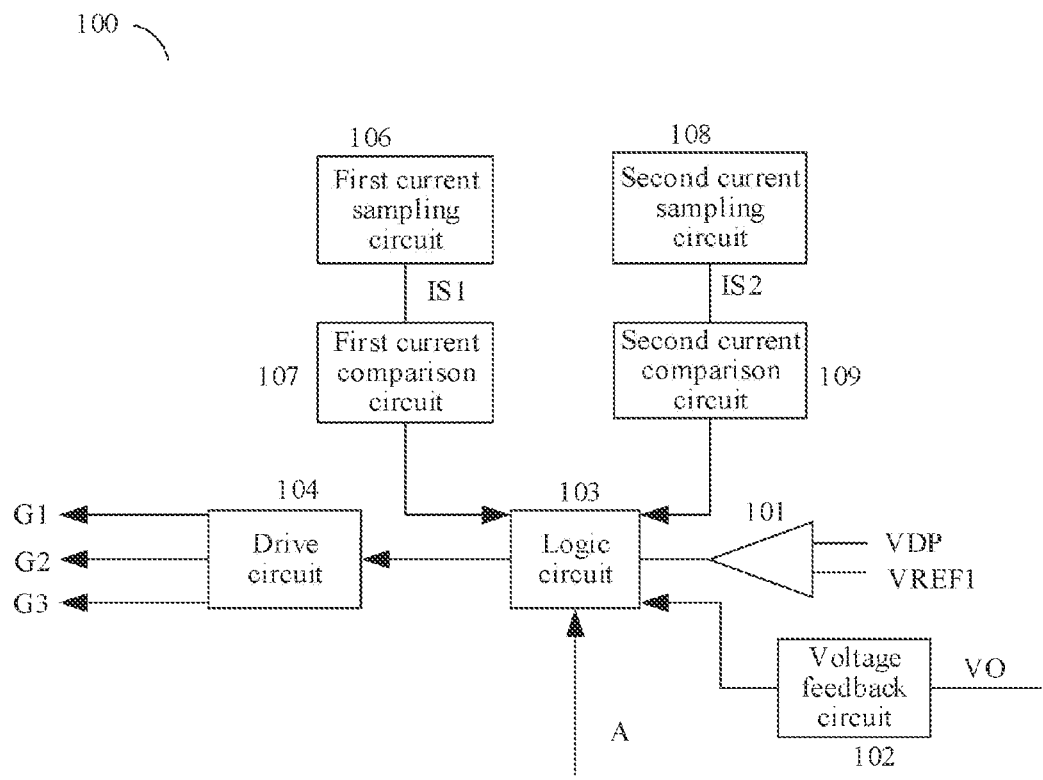
FIG. 11 is a schematic diagram of the control circuit 100 in another embodiment of the present invention.

In the charging state, the current passing through the second conduction element D02 is determined by the input current. When the input current is relatively large, the current passing through the second conduction element D02 will also be large, and the second conduction element D02 has great loss and produces lots of heat. In order to reduce the loss of the second conduction element, the output end of the charging circuit is charged only when the input current is small. An embodiment of the single live line charging circuit is shown in FIG. 10, current detection ports IS1 and IS2 are added. The circuit block diagram of the control circuit 100 is shown in FIG. 11, and the control circuit 100 further includes the first current sampling circuit 106, the first current comparison circuit 107, the second current sampling circuit 108 and the second current comparison circuit 109. The logic circuit 103 receives the output voltages of the first current comparison circuit 107 and the second current comparison circuit 109. The first current sampling circuit 106 samples the current flowing through the first switch, and the second current sampling circuit 106 samples the current flowing through the second switch, and the two currents indicate the input current. It should be noted that the input current can also be indicated by sampling the current from other places. When the first current comparison circuit 107 or the second current comparison circuit 109 detects that the input current is less than the first current threshold, the logic circuit 103 controls the drive circuit 104 to drive the second switch to be turned off, so as to charge the output end of the charging circuit. When the first current comparison circuit 107 or the second current comparison circuit 109 detects that the input current is greater than the first current threshold, the logic circuit 103 controls the drive circuit 104 to drive the second switch to be turned on, and the current passes from the first input end L1 through the second switch to the third switch and then to the second input end L2, thus not charging the output end of the charging circuit. The gate voltage G3 of the third switch can be high or low. When the gate voltage G3 of the third switch is low, the current passes through the body diode of the third switch. In order to further reduce the loss, the gate voltage of the third switch is controlled to be high, the third switch is turned on, and the voltage drop of the current on the third switch is further reduced.

In the half-wave power supply mode, the capacitor CS can be charged for only half of the power frequency cycle. In order to widen the output power range, the charging circuit can adopt the full-wave power supply mode. Referring to FIG. 5, the charging circuit further includes the third conduction element D03, and the second input end L2 is connected to the first end of the first switch Q01 through the third conduction element D03.

In an embodiment, the block diagram of the control circuit 100 is shown in FIG. 9. In the charging state, when the comparator 101 detects that the voltage VDP of the first input end is greater than the voltage VDN of the second input end, the logic circuit 103 controls the drive circuit 104 to drive the second switch Q02 to be turned off, and drive the third switch Q03 to be turned off or completely turned on, or controls the control electrode voltage of the third switch Q03 to make the drain voltage of the third switch Q03 close to the third voltage. When the comparator 101 detects that the voltage VDP of the first input end is less than the voltage VDN of the second input end, the logic circuit 103 controls the drive circuit 104 to drive the third switch Q03 to be turned off and drive the second switch Q02 to be turned off or completely turned on, or controls the control electrode voltage of the second switch to make the drain voltage of the second switch close to the second voltage. In the non-charging state, the logic circuit 103 controls the drive circuit 104 to drive both the second switch Q02 and the third switch Q03 to be turned on.

Figure 12:
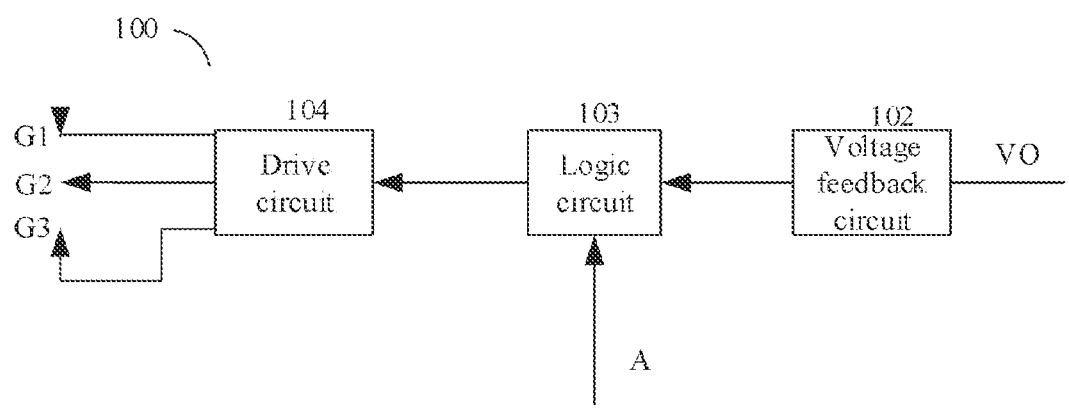
FIG. 12 is a schematic diagram of the control circuit 100 in still another embodiment of the present invention.
Figure 13:
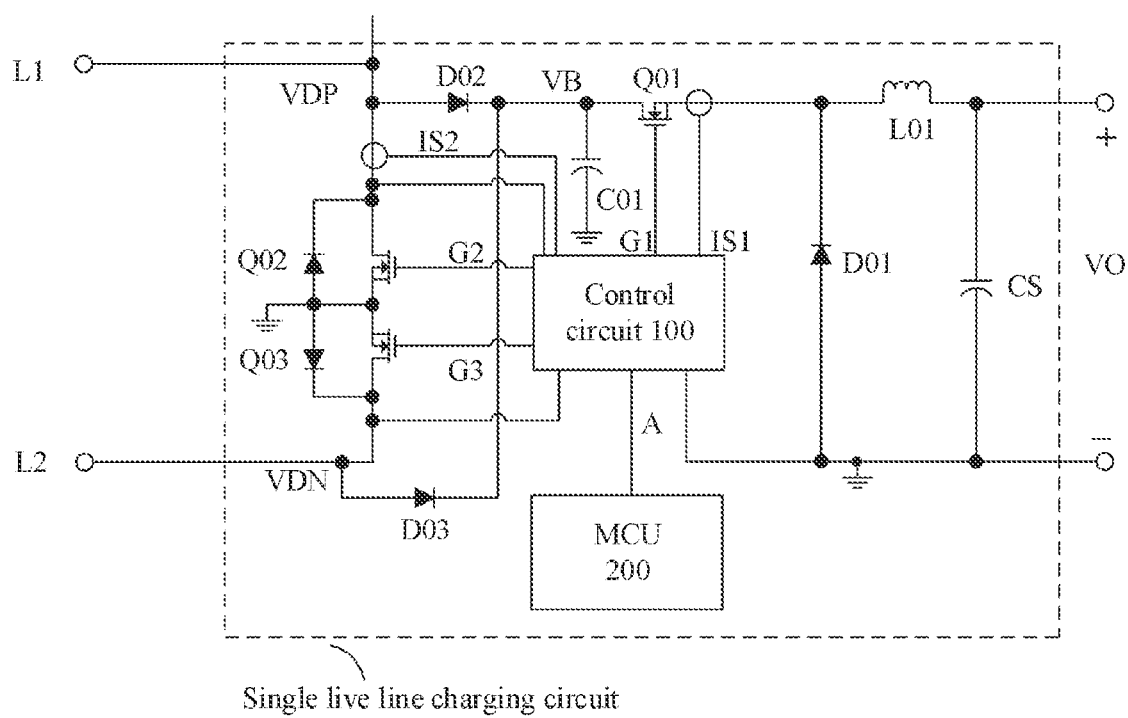
FIG. 13 is a schematic diagram of a single live line full-wave power supply circuit in another embodiment of the present invention.

In the above embodiment, when the voltage VDP of the first input end is greater than the voltage VDN of the second input end and the voltage VDP of the first input end is less than the voltage VDN of the second input end, both the second switch Q02 and the third switch Q03 are turned off, so that it is not necessary to compare the voltage of the first input end with the voltage of the second input end, as a result of which the comparator 101 can be removed. Therefore, the block diagram of the control circuit 100 is shown in FIG. 12.

In the full-wave power supply mode, in the charging state, the current passing through the second conduction element D02 and the third conduction element D03 is determined by the input current. When the input current is relatively large, the current passing through the second conduction element D02 and the third conduction element D03 will also be large, and the second conduction element D02 and the third conduction element D03 have great loss and produce lots of heat. In order to reduce the loss of the second conduction element and the third conduction element, the output end of the charging circuit is charged only when the input current is small. An embodiment of the single live line charging circuit in the full-wave power supply mode is shown in FIG. 12, current detection ports IS1 and IS2 are added. The circuit block diagram of the control circuit 100 is shown in FIG. 11. The difference between the full-wave power supply mode and the half-wave power supply mode is as follows: when the voltage of the first input end is less than the voltage of the second input end, the full-wave power supply circuit can still charge the output end of the charging circuit, and the first current comparison circuit 107 and the second current comparison circuit 109 still need to compare the input current with the first current threshold; when the input current is less than the first current threshold, the logic circuit 103 controls the third switch Q03 to be turned off to charge the output end of the charging circuit; when the input current is greater than the first current threshold, the logic circuit 103 controls the third switch Q03 to be turned on and does not charge the output end of the charging circuit.

In an embodiment, as shown in FIGS. 2 and 5, the charging circuit further includes a microprocessor MCU, and the microprocessor MCU receives a signal that the load circuit is turned on or off, and converts the signal into the signal A indicating that the load circuit is turned on or off, and sends the signal A to the control circuit 100.

It should be noted that in some embodiments, the half-wave power supply circuit is used as examples, but these embodiments are not limited to the half-wave power supply circuit, but can be applied to the full-wave power supply circuit.

Although the embodiments are separately illustrated and described above, the embodiments contain some common technologies. For those skilled in the art, replacements and integrations between the embodiments may be performed. Any content not clearly recorded in one of the embodiments may be determined based on another embodiment where the content is recorded.

The embodiments described above do not constitute a limitation on the protective scope of the technical solution of the present invention. Any modification, equivalent replacement, and improvement made within the spirit and principle of the above-mentioned embodiments shall fall within the protective scope of the technical solution of the present invention.

The invention claimed is:

1. A control method of a single live line charging circuit, wherein the single live line charging circuit comprises a first switch, a first conduction element, a first inductor, a second switch, a second conduction element, a third switch, a first input end and a second input end; the first input end is connected to a first end of the first switch through the second conduction element; the first switch, the first conduction element and the first inductor constitute a buck circuit; the first input end is connected to a reference ground through the second switch, the second input end is connected to the reference ground through the third switch, and an alternating current input is connected to the first input end through a load circuit;
    wherein when the load circuit is turned off, the first switch, the first conduction element and the first inductor work in a buck mode, and both the second switch and the third switch are turned off;

when the load circuit is turned on, an output end of the single live line charging circuit is in a charging state when a voltage of the output end of the single live line charging circuit relative to the reference ground is lower than a first voltage threshold, the output end of the single live line charging circuit is in a non-charging state when the voltage of the output end of the single live line charging circuit rises to a second voltage threshold, and the output end of the single live line charging circuit returns to the charging state when the voltage of the output end of the single live line charging circuit decreases to the first voltage threshold;

wherein the second voltage threshold is greater than the first voltage threshold; and the first conduction element and the second conduction element are diodes or switches.

2. The control method of the single live line charging circuit of claim 1, wherein, in the charging state, when a voltage of the first input end is greater than a voltage of the second input end, the second switch is turned off, the third switch is turned off or completely turned on, or a drain voltage of the third switch is made to approach a third voltage by controlling a control electrode voltage of the third switch; when the voltage of the first input end is less than the voltage of the second input end, the third switch is completely turned on, the second switch is turned off or completely turned on, or a drain voltage of the second switch is made to approach a second voltage by controlling a control electrode voltage of the second switch; in the non-charging state, both the second switch and the third switch are turned on.

3. The control method of the single live line charging circuit of claim 2, wherein, in the charging state, when an input current is less than a first current threshold, the input current charges the output end of the single live line charging circuit.

4. The control method of the single live line charging circuit of claim 1, wherein, the single live line charging circuit further comprises a third conduction element, and the second input end is connected to the first end of the first switch through the third conduction element.

5. The control method of the single live line charging circuit of claim 4, wherein, in the charging state, when a voltage of the first input end is greater than a voltage of the second input end, the second switch is turned off, the third switch is turned off or completely turned on, or a drain voltage of the third switch is made to approach a third voltage by controlling a control electrode voltage of the third switch; when the voltage of the first input end is less than the voltage of the second input end, the third switch is turned off, the second switch is turned off or completely turned on, or a drain voltage of the second switch is made to approach a second voltage by controlling a control electrode voltage of the second switch; in the non-charging state, both the second switch and the third switch are turned on.

6. The control method of the single live line charging circuit of claim 5, wherein, in the charging state, when an input current is less than a first current threshold, the input current charges the output end of the single live line charging circuit.

7. The control method of the single live line charging circuit of claim 4, wherein, in the charging state, when an input current is less than a first current threshold, the input current charges the output end of the single live line charging circuit.

8. The control method of the single live line charging circuit of claim 1, wherein, in the charging state, when an input current is less than a first current threshold, the input current charges the output end of the single live line charging circuit.

9. The control method of the single live line charging circuit of claim 8, wherein, in the charging state, when a current of the first switch is greater than the first current threshold, the first switch is turned off, the second switch and the third switch are turned on.

10. A single live line charging circuit, using the control method of claim 1.

11. The single live line charging circuit of claim 10, wherein, in the charging state, when a voltage of the first input end is greater than a voltage of the second input end, the second switch is turned off, the third switch is turned off or completely turned on, or a drain voltage of the third switch is made to approach a third voltage by controlling a control electrode voltage of the third switch; when the voltage of the first input end is less than the voltage of the second input end, the third switch is completely turned on, the second switch is turned off or completely turned on, or a drain voltage of the second switch is made to approach a second voltage by controlling a control electrode voltage of the second switch; in the non-charging state, both the second switch and the third switch are turned on.

12. The single live line charging circuit of claim 10, wherein, the single live line charging circuit further comprises a third conduction element, and the second input end is connected to the first end of the first switch through the third conduction element.

13. The single live line charging circuit of claim 12, wherein, in the charging state, when a voltage of the first input end is greater than a voltage of the second input end, the second switch is turned off, the third switch is turned off or completely turned on, or a drain voltage of the third switch is made to approach a third voltage by controlling a control electrode voltage of the third switch; when the voltage of the first input end is less than the voltage of the second input end, the third switch is turned off, the second switch is turned off or completely turned on, or a drain voltage of the second switch is made to approach a second voltage by controlling a control electrode voltage of the second switch; in the non-charging state, both the second switch and the third switch are turned on.

14. The single live line charging circuit of claim 10, wherein, in the charging state, when an input current is less than a first current threshold, the input current charges the output end of the single live line charging circuit.

15. The single live line charging circuit of claim 14, wherein, in the charging state, when a current of the first switch is greater than the first current threshold, the first switch is turned off, the second switch and the third switch are turned on.

16. A control circuit of a single live line charging circuit, wherein the single live line charging circuit comprises a first switch, a first conduction element, a first inductor, a second switch, a second conduction element, a third switch, a first input end and a second input end; the first input end is connected to a first end of the first switch through the second conduction element; the first switch, the first conduction element and the first inductor constitute a buck circuit; the first input end is connected to a reference ground through the second switch, the second input end is connected to the reference ground through the third switch, and an alternating current input is connected to the first input end through a load circuit;

wherein when the control circuit receives a first signal, the control circuit controls the first switch, the first conduction element and the first inductor to work in a buck mode, and the control circuit controls both the second switch and the third switch to be turned off, wherein the first signal indicates a turn-off of the load circuit;

when the control circuit receives a second signal, the control circuit controls an output end of the single live line charging circuit to be in a charging state when a voltage of the output end of the single live line charging circuit relative to the reference ground is lower than a first voltage threshold, the control circuit controls the output end of the single live line charging circuit to be in a non-charging state when the voltage of the output end of the single live line charging circuit rises to a second voltage threshold, and the output end of the single live line charging circuit returns to the charging state when the voltage of the output end of the single live line charging circuit decreases to the first voltage threshold, wherein the second signal indicates a turn-on of the load circuit; and the second voltage threshold is greater than the first voltage threshold; the first conduction element and the second conduction element are diodes or switches.

17. The control circuit of the single live line charging circuit of claim 16, wherein, the control circuit detects a voltage of the first input end and a voltage of the second input end; in the charging state, when the voltage of the first input end is greater than the voltage of the second input end, the control circuit controls the second switch to be turned off, controls the third switch to be turned off or completely turned on, or controls a control electrode voltage of the third switch to make a drain voltage of the third switch approach a third voltage; when the voltage of the first input end is less than the voltage of the second input end, the control circuit controls the third switch to be completely turned on, controls the second switch to be turned off or completely turned on, or controls a control electrode voltage of the second switch to make a drain voltage of the second switch approach a second voltage; in the non-charging state, the control circuit controls both the second switch and the third switch to be turned on.

18. The control circuit of the single live line charging circuit of claim 16, wherein, the single live line charging circuit further comprises a third conduction element, and the second input end is connected to the first end of the first switch through the third conduction element.

19. The control circuit of the single live line charging circuit of claim 16, wherein, the single live line charging circuit further comprises a microprocessor, and the microprocessor receives a signal that the load circuit is turned on or off, converts the signal into a signal indicating a turn-on or a turn-off of the load circuit, and sends the signal indicating the turn-on or the turn-off of the load circuit to the control circuit.

* * * * *